Patented Feb. 21, 1950

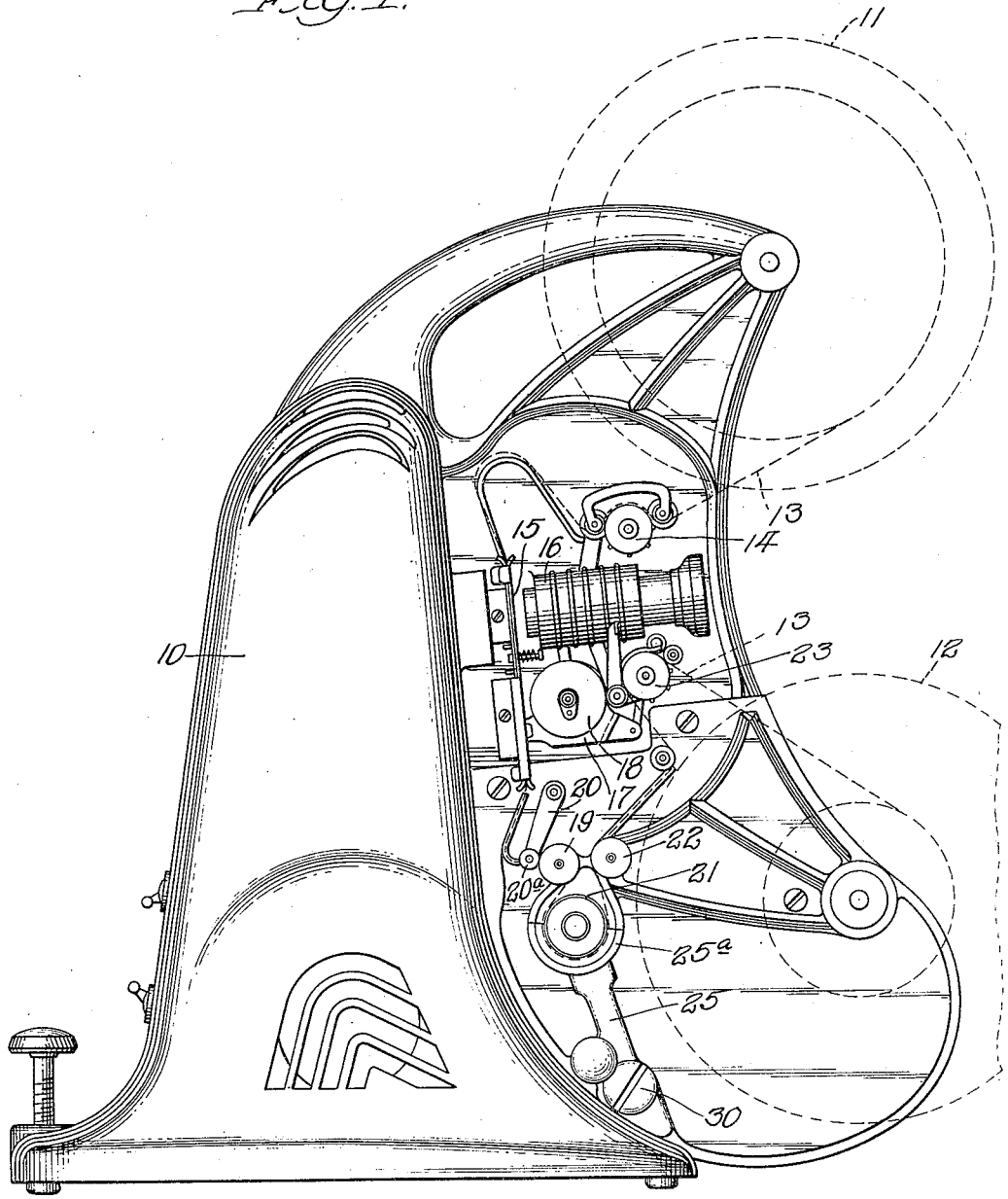

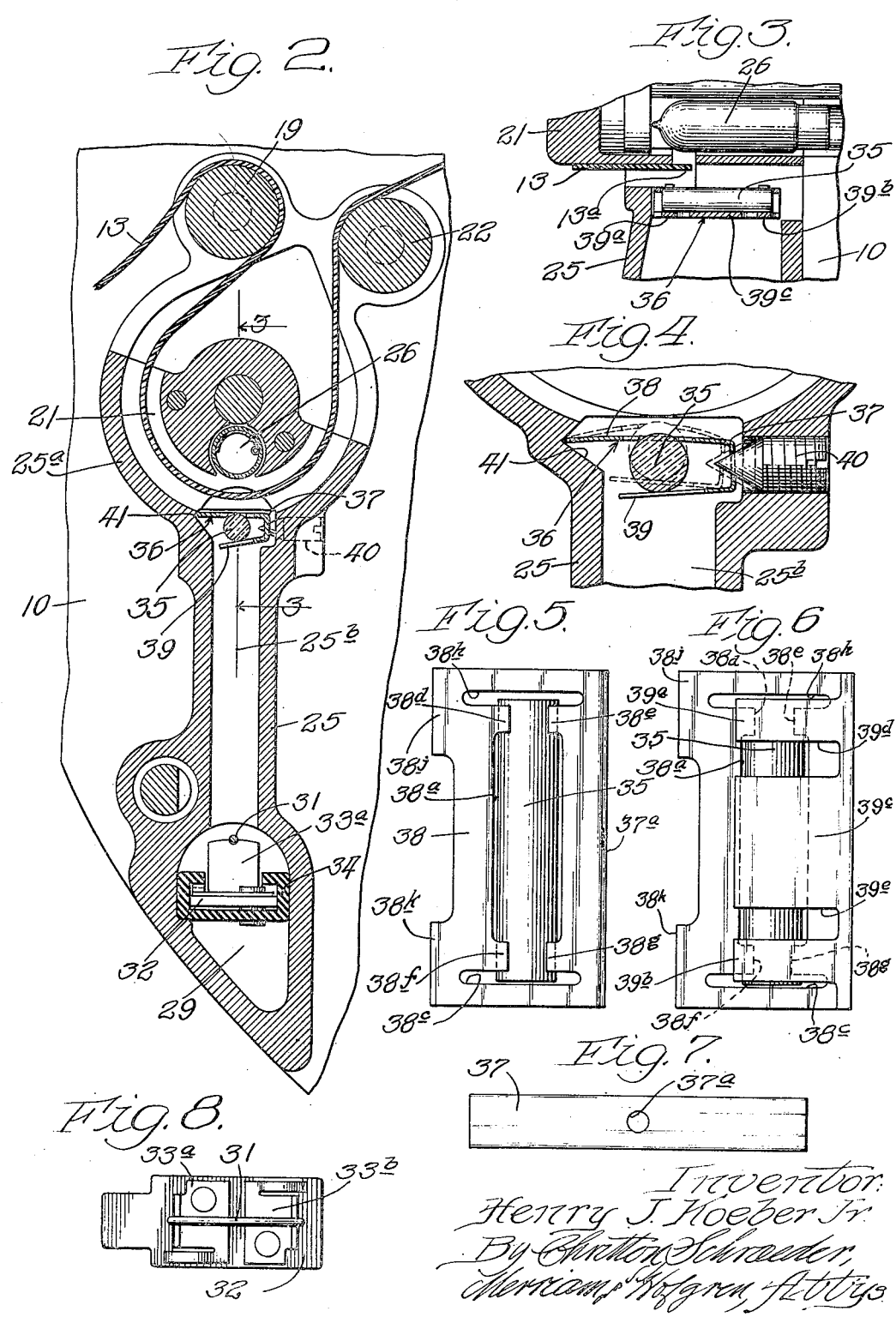

2,498,555

UNITED STATES PATENT OFFICE 2,498,555

ADJUSTABLE SUPPORTING AND FOCUSING MOUNT FOR SOUND PROJECTOR LENS

Henry J. Koeber, Jr., Chicago, Ill., assignor to Illinois Watch Case Co., a corporation of Illinois Application June 21, 1948, Serial No. 34,193

5 Claims. (Cl. 88—57)

This invention relates to a focusing mount for a lens, and more particularly to a focusing mount having a resilient lens-supporting portion adapted to be deformed to effect focusing movement of said lens.

One feature of this invention is that it provides an improved focusing mount for a lens; another feature of this invention is that it provides a focusing mount comprising a mounting member having a resilient lens-supporting portion extending generally perpendicular to the optical axis of the lens and adapted to be deformed to effect focusing movement of the lens; another feature of this invention is that the mounting member comprises a generally U-shaped resilient bracket having two adjacent, generally parallel leg portions adapted to support a cylindrical lens therebetween; a further feature of this invention is that an adjusting member, which may comprise a set screw engaging the base of the mounting bracket, is adapted to be moved in a direction generally perpendicular to the optical axis of the lens to effect focusing of the lens; an additional feature of this invention is that the mounting bracket legs between which the lens is supported have openings therein, at least a portion of said lens lying between aligned portions of said openings; yet a further feature of this invention is that the mounting bracket in which the lens is carried has one leg portion which is supported at opposite ends and another leg portion which is supported at one end only; still another feature of this invention is that it provides a focusing mount for a lens comprising a mounting member having a resilient lens-supporting portion which is slightly bowed in its normal mounted position and an adjusting member adapted to change the amount of bow of said resilient portion to effect focusing movement of said lens; and an additional feature of this invention is that it provides a focusing mount for a lens particularly adapted for use in a sound projector having a straight filamentary wave emitting member adapted to emit waves contained within a narrow frequency band, said mount having a resilient portion adapted to support a cylindrical lens and being deformable to effect movement of said lens for bringing said waves into sharp focus in a narrow line.

Further features and advantages of this invention will be apparent from the following specification, and from the drawings in which:

Fig. 1 is a side elevation of a sound projector incorporating the invention; Fig. 2 is an enlarged fragmentary vertical section through a portion of the projector shown in Fig. 1, illustrating my improved focusing mount; Fig. 3 is a fragmentary vertical section along the line 3—3 of Fig. 2; Fig. 4 is a further enlarged fragmentary view of a portion of the apparatus of Fig. 2, the focusing mount being shown in full lines in one position and in broken lines in another position; Fig. 5, is a top plan view of the lens holding bracket shown in Fig. 4; Fig. 6 is a bottom plan view of the lens holding bracket shown in Fig. 4; Fig. 7 is a back elevational view of said bracket looking from the right of Fig. 5; and Fig. 8 is a top plan view of the wave emitting member shown in Fig. 2 and its supporting bracket.

While it will be apparent that my improved focusing mount may find utility in many different types of apparatus, the invention is illustrated as being incorporated in a motion picture sound projector, and the invention will be described in connection with such a projector, although it will be understood that the invention is not limited in its scope to a motion picture projector or other sound system.

In the projector illustrated in Fig. 1, a casing 10 carries a film feed spool 11 and a film take-up spool 12, at least the take-up spool being driven in conventional manner, as by an electric motor (not shown) in the casing 10. A film 13 which is initially wound on the feed spool 11 is transferred to the take-up spool 12 during the operation of the projector, this film passing over a sprocket 14 from where it is fed past a film gate 15 which may be conventional. A projection lamp (not shown) within the casing 10 illuminates that portion of the film which is opposite the aperture in the gate 15, and a lens arrangement 16 is adapted to focus the beam of light on a screen.

As is well understood in the art, means are provided for causing the film to move intermittently past the gate so that each frame of the film is stationary during the time that light from the projection lamp is thrown upon it. This means is illustrated as comprising a claw 17 driven in conventional manner by a cam arrangement 18. After leaving the gate 15 the film passes over a roller 19, being held in frictional contact with said roller by a lever arm 20 which carries a supplemental roller 20a. A sound drum 21 carries the now continuously moving film past the sound take-off apparatus, and the film then moves over another roller 22, over a take-up sprocket 23, and on the take-up spool 12. The general operation of the apparatus just described is conventional and will not be described in greater detail here.

As is conventional the film 13 carries (usually along one edge) a sound track 13a, and a source of actuating waves is provided, these waves being modulated by the sound track and reproduced in any conventional manner, as for example, by an amplifier and speaker arrangement associated with the projector. In a projector being built and incorporating the invention here being claimed, the audio variations taken from the sound track are caused to modulate radio frequencies and these are transmitted to a separate amplifying and reproducing system, as for example, that of a conventional radio receiver.

In a conventional sound projector provided with a source of radiant energy on one side of the sound track and a translating device, as for example a photoelectric cell, on the other side of the sound track, the waves from the source are modulated by the sound track on the film and the modulated waves are picked up by the photoelectric cell and converted into electrical energy which is then amplified and translated into sound. In the past it has been the usual practice to utilize an incandescent exciter lamp as the radiant source of actuating waves. The use of such an exciter lamp resulted in certain serious problems, and in the application of Philip L. Karr for "Actuating apparatus for sound systems," filed March 5, 1948, Serial No. 13,245, an improved means for developing actuating waves was disclosed and claimed. Inasmuch as the present invention is particularly adapted for use with such actuating apparatus, and inasmuch as the present invention provides additional advantages when used in combination with this actuating apparatus, such apparatus will be briefly described.

If a conventional incandescent exciter lamp were used to provide the actuating waves, and if the exciter lamp were energized from a source of varying current, as for example, a conventional 60 cycle alternating current source (which is usually desirable since the film is usually driven by an A. C. motor), the temperature of the exciter lamp filament is constantly being increased or decreased at the rate of 120 cycles per second. While the filament may retain enough brightness that this change is not noticeable to the eye, actually the intensity of the illumination emitted by the exciter lamp varies at a frequency of 120 cycles per second in an amount of the order of 10%, which in effect modulates the actuating waves emitted by the lamp with a 120 cycle signal, so that a corresponding hum, sometimes termed a "60 cycle hum" by virtue of the frequency of the current causing it is present in the sound output. While it is possible to minimize or eliminate this 60 cycle hum, by providing a separate oscillator for energizing an exciter lamp filament with an alternating current having a high frequency above the range of audibility, by employing sharply tuned reduction circuits, or by providing a separate D. C. source, as for example, a battery, to energize the lamp, each of these methods of minimizing hum requires the addition of expensive and bulky apparatus to the projector.

The apparatus shown in Figs. 2 and 8, and specifically disclosed and claimed in the aforementioned application of Philip L. Karr, and in the application of Percival H. Case, Philip L. Karr and Henry J. Koeber, filed June 21, 1948, Serial No. 34,194, provides an extremely effective and simple way to eliminate hum from the sound output, and in addition this apparatus provides a source of actuating waves which (especially in combination with the invention disclosed and claimed here) is considerably less complex than all sources earlier known, is cheap, and which improves the operation of the projector.

The sound take-off apparatus of the projector illustrated in Fig. 2 comprises a casing 25 which is carried on the projector casing 10 adjacent the sound drum 21. At the end near the sound drum the casing 25 is flared into a semicylindrical shield 25a which protects the photosensitive pick-up device 26 from extraneous light waves. As may be seen in Fig. 3, this photosensitive pick-up device extends within the sound drum 21, so that a portion of the photosensitive device is adjacent the sound track 13a on the film. In the apparatus illustrated, the photosensitive device 26 preferably comprises a lead sulfide cell which is extremely sensitive to waves in the infra-red portion of the spectrum, this type of cell being of the order of 20 or 30 times more sensitive to these waves than the cesium cell usually used for sound reproduction in the motion picture field. This sensitivity to relatively low frequencies provides advantages, as will hereafter appear.

At the end of the casing 25 remote from the sound drum there is a housing 29 having an opening which is closed by a threaded cap 30 (see Fig. 1), and instead of an incandescent exciter lamp, in accordance with the invention disclosed in application Serial No. 13,245, above noted, a straight filamentary radiant wave emitting member 31 is provided, this wave emitting member preferably comprising a segment of Nichrome resistance wire about one-half inch long and having a diameter of about .012 inch.

This wave emitting member preferably is connected in series with an impedance already in the system, as for example, a projection lamp, in order to limit the current through the wave emitting member which has a relatively small resistance, usually less than one ohm, and according to the invention disclosed in the application last above mentioned, the wave emitting member is heated only to a radiant temperature, as for example, a temperature of an order of 1500–1800° F., so that it is characterized by a dull red or orange-red glow. When heated to such a temperature, the wave emitting member emits waves contained within the relatively narrow infra-red and red wave frequency band comprising only a small portion of the radiant energy frequency range near the lower end of said radiant energy frequency range. Changes in the intensity of these relatively low frequency radiant waves as the result of temperature change in the straight filamentary wave emitting member are only very small when compared to changes in intensity in the relatively short yellow, blue and white waves emitted by conventional incandescent exciter lamps. Consequently, the wave emitting member may be energized directly from the 60 cycle commercial alternating current which energizes the drive motor of the projector, and the small variations in intensity of the emitted waves due to the cyclical temperature changes in the member 31 are so small that hum in the sound output is substantially entirely eliminated. Additional advantages are obtained from the use of such a wave emitting member, as the member may be operated in open air and need not be encased in a glass envelope or other protective device. As illustrated in Figs. 2 and 8, the member 31 is mounted on a bracket 32 by means of a pair of spring clips 33a and 33b, these spring clips preferably being biased away from each other in order to maintain the member 31 straight despite changes in its length occurring as a result of change in its temperature. The bracket 32 is slidable in a bracket 34 carried in the housing 29 and providing a trackway which supports the bracket 32. This structure is disclosed and claimed in the above noted application of Percival H. Case, Philip L. Karr and Henry J. Koeber.

The present invention relates to a foscusing mount for a lens, here illustrated as comprising a mount for the lens which focuses the waves from the member 31 into the sound track 13a of the film 13.

Referring particularly to Figs. 2, 3 and 4, a longitudinal channel 25b in the casing 25 provides a path for the actuating waves from a source 31, and a cylindrical focusing lens 35 is supported in the channel 25b and in the path of the actuating waves by means of a bracket designated generally as 36. The cylindrical lens 35 may comprise a section of commercially obtainable glass rod having a diameter of about one-eighth of an inch.

The bracket 36 is generally U-shaped and, as shown in Figs. 5, 6 and 7, comprises a base portion 37 having a central opening 37a for engagement with an adjusting member to be described. A top leg 38 (as the parts are positioned in Figs. 2, 3 and 4) extends approximately at right angles from the base portion 37 and has a relatively large longitudinally extending central opening 38a and transversely extending slots 38b and 38c adjacent opposite ends, stub portions 38d, e, f, and g extending into said opening adjacent said respective slots, as shown in Fig. 5, and providing clips for supporting the lens 35.

A lower leg 39 extends from the base portion 37 substantially parallel to the top leg 38 and has end portions 39a and 39b and a central portion 39c, the central portion being spaced from each of the end portions to provide openings 39d and 39e. The bracket 36 is formed of a resilient sheet material, as for example, thin sheet metal, and the bracket is adapted to support the lens 35 between the legs 38 and 39 thereof adjacent the sound track 13a, with at least a portion of said lens lying between aligned portions of the openings in the respective legs of the bracket, as shown in Figs. 2, 3 and 6.

An adjusting member for deforming the resilient bracket to effect focusing movement of the lens comprises a set screw 40 threaded through the wall of the casing 25 and extending into the chamber 25b, the pointed end of the adjusting member 40 engaging the base portion of the bracket 36 and being held in engagement therewith by its extension into the opening 37a.

The resilient lens-supporting legs 38 and 39 of the mounting bracket 36 extend generally perpendicular to the optical axis of the cylindrical lens 35 and support the lens in the path of the actuating waves with the longitudinal axis of the lens perpendicular to the direction of travel of said waves, and the adjusting member effects focusing movement of the lens upon movement of said adjusting member in a direction generally perpendicular to the optical axis of the lens.

This movement of the adjusting member 40 and the focusing movement of the lens caused thereby is illustrated in Fig. 4, wherein the lens is shown in its normal mounted position in full lines, the adjusting member 40 being backed off so that with the bracket 36 in its normal mounted position the generally parallel legs 38 and 39 of the bracket are slightly bowed. In the position shown in broken lines in said figure the adjusting set screw 40 has been moved in a direction perpendicular to the optical axis of the lens toward the lens, and the amount of bow of the resilient legs has been changed to effect focusing movement of the lens, the lens having moved to a position more closely adjacent the sound track 13a of the film 13.

Inasmuch as the top leg 38 is supported at its base end by the set screw 40 and at its opposite end by engagement of the terminal extensions 38j and k of said leg (see Figs. 5 and 6) with a groove 41 in the wall of the chamber 25b, while the lower leg 39 is supported only at its base end, the lower leg follows the changes in the bow in the top leg and no stress is put on the lens 35 so that there is no danger that such lens will be warped or broken.

The lens mount above described provides a simply constructed and easily operated focusing arrangement which may find utility in many systems where it is desired to provide adjustable focusing means for waves. Particular advantages reside in the utilization of the improved lens mount in a sound projector as illustrated. Since the waves emitted by the member 31 are contained within a narrow frequency band, a simple cylindrical lens of the type illustrated together with the improved focusing mount may be utilized, and the actuating waves from the member 31 may be brought into sharp focus in a narrow line on the sound track of the film merely by moving the adjusting member 40 in a direction perpendicular to the optical axis of the lens. Once the proper adjustment is made to focus the waves in a narrow line on the sound track, the apparatus is so constructed that the adjustment will not be changed accidentally, as by vibration of the unit, and since the adjusting member 40 is recessed in the casing 25, it cannot be accidentally moved to change the adjustment.

In the projector illustrated, the cylindrical lens mounted adjacent the sound track, when properly focused, provides a 12–1 reduction image, so that using a wave emitting member 31 having a diameter of .012 inch and spaced a substantial distance from the lens, (preferably of the order of at least ten times the diameter of the lens) the actual image on the film, located at the focus of the lens may be a very narrow line less than .001 inch in width. Since the film moves over the sound drum at a fixed speed, the image on the film must be sharp enough that the modulation indications on the sound track do not overlap on the image at the highest frequency which it is desired to reproduce. With the apparatus here illustrated and described, it is possible to reproduce with clarity frequencies of the order of 7000 cycles per second without using the expensive and complex lens systems formerly found in film projectors.

While I have shown and described one embodiment of my invention, it is to be understood that it is capable of many modifications. Changes, therefore, in the construction and arrangement may be made without departing from the spirit and scope of the invention as disclosed in the appended claims.

I claim:

1. A focusing mount for a lens, comprising: a generally U-shaped bracket of resilient sheet material having openings in the leg portions, said bracket being adapted to support the lens between the legs thereof with a portion of said lens lying between aligned portions of said openings, one leg portion being supported at its base end and its opposite end and the other leg portion being supported at its base end only; and a movable adjusting member for deforming the leg portions of said bracket to effect focusing of said lens, said adjusting member engaging the base of said bracket and being movable in a direction generally perpendicular to the optical axis of the lens to effect such focusing.

2. A focusing mount for a lens, comprising: a generally U-shaped bracket of resilient sheet material having openings in the leg portions, said bracket being adapted to support a cylindrical lens between the legs thereof with a portion of said lens lying between aligned portions of said openings, one leg portion being supported at opposite ends and the other leg portion being supported at one end only, said legs being slightly bowed in their normal mounted position; and a movable adjusting member adapted to change the amount of bow of said leg portions to effect focusing movement of said lens, said adjusting member engaging the base of said bracket and being movable in a direction generally perpendicular to the optical axis of the lens to effect such focusing.

3. In a sound system having a source of actuating waves contained within a narrow frequency band and a cylindrical lens for focusing said waves, a focusing mount for said lens, comprising: a generally U-shaped bracket of resilient sheet material having openings in the leg portions, said bracket being adapted to support said lens between the legs thereof, with the longitudinal axis of the lens perpendicular to and in the path of said waves, a portion of said lens lying between aligned portions of said openings, one leg portion of said bracket being supported at opposite ends and the other leg portion being supported at one end only; and a movable adjusting member for deforming the leg portions of said bracket to effect movement of said lens for bringing said waves into sharp focus, said adjusting member engaging the base of said bracket and being movable in a direction generally perpendicular to the optical axis of the lens to effect such focusing.

4. In a sound projector having a straight filamentary wave emitting member adapted to emit waves contained within a narrow frequency band and a cylindrical lens for focusing said waves on the sound track of a film, a focusing mount for said lens, comprising: a generally U-shaped bracket of resilient sheet material having openings in the leg portions, said bracket being adapted to support said lens between the legs thereof with the longitudinal axis of the lens perpendicular to and in the path of said waves, a portion of said lens lying between aligned portions of said openings adjacent said sound track, said legs being slightly bowed in their normal mounted position; and a movable adjusting member adapted to change the amount of bow of said leg portions to effect movement of said lens for bringing said waves into sharp focus in a narrow line on said sound track, said adjusting member engaging the base of said bracket and being movable in a direction generally perpendicular to the optical axis of the lens to effect such focusing.

5. Apparatus of the character claimed in claim 4, wherein one of said leg portions is supported at its base end and its opposite end and the other of said leg portions is supported at its base end only.

HENRY J. KOEBER, Jr.

REFERENCES CITED

The following references are of record in the file of this patent:

UNITED STATES PATENTS

| Number | Name | Date |
|---|---|---|
| 1,958,996 | Hansen et al. | May 15, 1934 |
| 1,989,836 | Whitman | Feb. 5, 1935 |
| 2,027,191 | Morrissey | Jan. 7, 1936 |
| 2,247,076 | Arey | June 24, 1941 |
| 2,324,076 | Goldberg | July 13, 1943 |
| 2,364,268 | Calvin et al. | Dec. 5, 1944 |
| 2,443,003 | Horwitz | June 8, 1948 |

FOREIGN PATENTS

| Number | Country | Date |
|---|---|---|
| 361,555 | Great Britain | Nov. 26, 1931 |